Nov. 10, 1942.   F. W. OPP   2,301,315
APPARATUS FOR TREATING LIQUIDS
Filed July 19, 1939
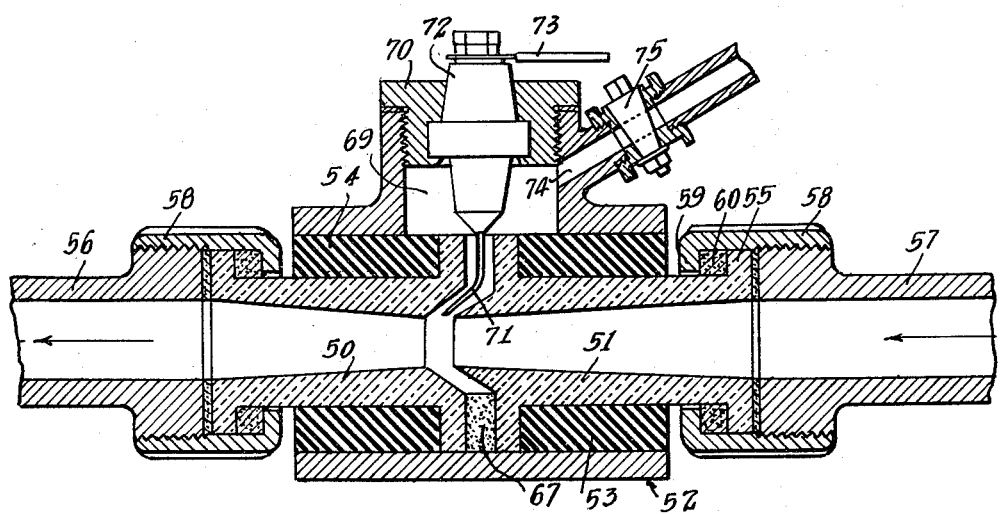
Inventor
Fred W. Opp
By Lyon & Lyon
Attorneys Patented Nov. 10, 1942

2,301,315

UNITED STATES PATENT OFFICE 2,301,315

APPARATUS FOR TREATING LIQUIDS

Fred W. Opp, Costa Mesa, Calif., assignor of sixteen and two-thirds per cent to Walter C. Collins, sixteen and two-thirds per cent to Clyde W. Catlin and sixteen and two-thirds per cent to Frederick C. Wright, all of Santa Ana, Calif.

Application July 19, 1939, Serial No. 285,455

4 Claims. (Cl. 47—1.3)

This invention relates to the treatment of liquids and particularly to the treatment of irrigation water to stimulate the rate of growth of plants.

An object of the invention is to increase the rate of growth of plants in a practical and economical way.

Another object is to treat liquids to sterilize them.

Another object is to provide a practical and economical method of treating water used to irrigate plants, whereby the water promotes the growth of the plants to a greater extent than it would if untreated.

Still another object is to provide suitable, practicable apparatus for carrying out my process.

Essentially, my invention consists in the application of electricity in a specific way to the water used to irrigate plants.

I have discovered that definite stimulation of the growth of plants may be had by treating the irrigating water with a low-current, high-potential, spark discharge. It seems equally essential that I provide a spark gap in the energizing circuit, the gap being preferably located adjacent the water being treated, although benefit is also obtained with the gap spaced from the water.

The invention will now be explained by describing in detail, with reference to the drawing, certain apparatus that may be employed.

The single figure of the drawing is a longitudinal sectional view of an apparatus in accordance with the invention, for electrically treating water flowing through pipes.

There is disclosed in the drawing an apparatus for effectively electrically treating water flowing through pipes under pressure without losing the pressure. This apparatus comprises a pair of conduit sections 50 and 51, respectively, made of electrical insulating material having substantial mechanical strength and impervious to the liquid to be treated. These conduits may be made of some such material as glass or porcelain. They are joined together in sealed relation to the exterior by a coupling member 52 which may be of metal, the conduit sections 50 and 51 being supported in the coupling member 52 by means of bushings 53 and 54, respectively, which may be of some relatively soft insulating material such as rubber. The outer ends of the conduit sections 50 and 51 are connected to the ends of the pipe line in any convenient manner. Thus the conduit section 50 may have outwardly extending flanges 55 adapted to be clamped against the ends of the pipes 56 and 57, respectively, by means of ferrules 58 threaded onto the ends of the pipes 56 and 57 and having inwardly extending similar flanges 59 adapted to engage packing rings 60 and compress them against the rear edges of the flanges 55.

The conduit sections 50 and 51 have their inner ends supported in spaced apart relation by the coupling member 52. However, the lower part of the space between these sections may be filled by some suitable insulating medium 67. On the upper side the open space between the conduit sections 50 and 51 opens into a chamber 69 formed within the coupling member 52. This space 69 is closed by a plug 70 containing an electrode 71 insulatingly supported in the plug 70, as by a porcelain bushing 72. The electrode 71 projects into the space 68 into close proximity with the juxtaposed bores of the conduits 50 and 51 and extends through the porcelain insulators 72 to the exterior, where it is connected to an electrical conductor 73.

The space 69 is connected by a passage 74 to a valve 75 through which gas may be introduced, when desired.

The bores of the conduit sections 50 and 51 are tapered toward the center so that the member 51 in effect defines a nozzle which contracts the stream of liquid flowing thereinto from the pipe 57 and causes the liquid to traverse the space between the inner ends of the conduits 50 and 51 as a jet having a free peripheral surface. The conduit member 50 expands from substantially the same diameter at its inner end as the diameter of the bore of the member 51 at its inner end, to substantially the bore of the pipe 56 at its outflow end. These two members 50 and 51 therefore define a Venturi passage having a low pressure point at the center where the pressure actually existing may be less than atmospheric. This tends to prevent the level of the liquid from rising to contact with the electrode 71.

Liquid is delivered through the structure from pipe 57 to pipe 56 and the wire 73 is connected to a source of high potential current, the other terminal of which is connected to the pipe 57 or the pipe 56; a spark discharge occurring between the end of the electrode 71 and the free surface of the liquid between the conduits 51 and 50. The proper rate of flow relative to the potential and current employed to condition the liquid to the desired extent, may be determined by experiment.

In some instances, it may be desirable to introduce air, oxygen or other gas into the space 68 where the spark discharge occurs, the spark discharging then tending to form ozone, which ozone is drawn into the liquid, and has a sterilizing effect.

By properly tapering the conduit members 50 and 51, the pressure at the point of discharge in space 68 may be brought below atmospheric pressures so that by merely opening the valve 75 air will be drawn in past the electrode 71 and into the stream of liquid.

If the design of the conduit sections 50 and 51 is not such as to produce a pressure below atmospheric at the electrode, then air or other gas that may be employed, may be admitted through the valve 75 from any suitable source, under pressure.

The apparatus described is not only useful for treating water to be used in irrigating plants to promote the growth thereof, as has been previously described, but is also suitable for treating water or liquids for other purposes, such as to sterilize them. In other words, this apparatus is useful for applying a spark discharge to liquids for any purpose for which it may be found desirable to so treat such liquids.

I have found that some electrodes produce better effects than others. Thus, in order of efficiency, I prefer to employ electrodes made of copper, lead, nickel, silver or platinum. I have found that electrodes made of zinc, aluminum, bismuth or cadmium produce substantially no results.

For the purpose of explaining the invention, a specific apparatus that may be employed in practicing the invention has been described in detail. However, it is to be understood that many variations can be made from the particular apparatus described, and the invention is, therefore, to be limited only to the extent set forth in the appended claims.

I claim:

1. Apparatus for electrically treating liquids flowing in a pipe line under pressure, comprising a section of conduit connectible into said pipe line, intermediate the ends thereof, and including nozzle means for projecting liquid flowing through the pipe into a stream having a free surface confined within said conduit, electrode means adjacent to but out of contact with said free surface, and means for applying high potential between said pipe and said electrode to produce a spark discharge between said electrode and said free surface of said liquid.

2. Apparatus for electrically treating liquids flowing in pipes, comprising a section of conduit connectible to said pipe and including nozzle means for directing liquid flowing through the pipe into a stream having a free surface, electrode means adjacent said free surface, and means for applying high potential between said pipe and said electrode to produce a spark discharge between said electrode and said free surface of said liquid, said conduit section defining a Venturi passage having a minimum pressure area adjacent said electrode.

3. Apparatus for electrically treating liquids flowing in pipes, comprising a section of conduit connectible to said pipe and including nozzle means for directing liquid flowing through the pipe into a stream having a free surface, electrode means adjacent said free surface, and means for applying high potential between said pipe and said electrode to produce a spark discharge between said electrode and said free surface of said liquid, said conduit section defining a Venturi passage having a minimum pressure area adjacent said electrode, and means for supplying a gas to said conduit adjacent said electrode.

4. Apparatus for electrically treating liquids flowing in pipe lines under pressure, comprising a section of conduit connectible into said pipe line, intermediate the ends thereof, and including nozzle means for projecting liquid flowing through the pipe into a stream having a free surface confined within said conduit, electrode means adjacent to but out of contact with said free surface, means for applying high potential between said pipe and said electrode to produce a spark discharge between said electrode and said free surface of said liquid, and means for supplying a gas to said conduit adjacent said electrode.

FRED W. OPP.